United States Patent
Nijakowski et al.

(10) Patent No.: US 9,511,756 B2
(45) Date of Patent: Dec. 6, 2016

(54) FAILSAFE PARKING ASSISTANCE SYSTEM

(75) Inventors: Klaus-Dieter Nijakowski, Heilbronn (DE); Heiner Messner, Markgroeningen (DE)

(73) Assignee: ROBERT BOSCH GMBH, Stuttgart (DE)

(*) Notice: Subject to any disclaimer, the term of this patent is extended or adjusted under 35 U.S.C. 154(b) by 1250 days.

(21) Appl. No.: 12/308,289

(22) PCT Filed: Sep. 18, 2007

(86) PCT No.: PCT/EP2007/059851
§ 371 (c)(1),
(2), (4) Date: May 5, 2010

(87) PCT Pub. No.: WO2008/046703
PCT Pub. Date: Apr. 24, 2008

(65) Prior Publication Data
US 2010/0217488 A1    Aug. 26, 2010

(30) Foreign Application Priority Data
Oct. 17, 2006   (DE) .................. 10 2006 048 910

(51) Int. Cl.
*B60T 17/22*    (2006.01)
*B60W 10/10*    (2012.01)
*B60W 10/184*   (2012.01)
(Continued)

(52) U.S. Cl.
CPC ............. *B60T 17/221* (2013.01); *B60W 10/10* (2013.01); *B60W 10/184* (2013.01); *B60W 50/029* (2013.01); *B60T 2201/10* (2013.01); *B60T 2270/402* (2013.01); *B60W 30/06* (2013.01);
(Continued)

(58) Field of Classification Search
CPC .. B60W 10/184; B60W 10/18; B60W 10/10; B60W 50/029; B60W 30/06; B60W 2520/10; B60W 2720/106; B60T 17/221; B60T 2201/10; B60T 2270/402
USPC ...... 701/48, 54, 62; 180/167, 169, 204, 443; 303/125
See application file for complete search history.

(56) References Cited

U.S. PATENT DOCUMENTS 3,821,700 A * 6/1974 Russell .................. 340/439
4,121,873 A * 10/1978 Durling .................. 303/7
(Continued)

FOREIGN PATENT DOCUMENTS

| DE | 198 26 687 | 12/1999 |
| DE | 100 06 656 | 6/2001 |

(Continued)

OTHER PUBLICATIONS international Search Report PCT/EP2007/059851 dated Jan. 3, 2008.

*Primary Examiner* — Behrang Badii
*Assistant Examiner* — Daniel L Greene
(74) *Attorney, Agent, or Firm* — Norton Rose Fulbright US LLP; Gerard Messina

(57) ABSTRACT

A method is described for protecting a parking assistance system from a failure of the service brake system. In order to prevent a collision of the vehicle with a surrounding object, the function of the service brake system is monitored and if an error is present, at least one other vehicle system, such as an automatic transmission or an automatic parking brake, is activated in order to brake the vehicle and/or interrupt the transmission of drive torque to the wheels.

14 Claims, 1 Drawing Sheet

(51) Int. Cl.
 *B60W 50/029* (2012.01)
 *B60W 30/06* (2006.01)
(52) U.S. Cl.
 CPC .... *B60W 2520/10* (2013.01); *B60W 2720/106* (2013.01)

(56) References Cited

U.S. PATENT DOCUMENTS

| | | | |
|---|---|---|---|
| 4,770,470 A * | 9/1988 | Tarumizu et al. | 303/6.01 |
| 6,647,328 B2 * | 11/2003 | Walker | 701/36 |
| 7,035,735 B2 * | 4/2006 | Knoop et al. | 701/301 |
| 7,103,460 B1 * | 9/2006 | Breed | B60C 23/0408 701/29.1 |
| 7,344,205 B2 * | 3/2008 | Kamiya et al. | 303/124 |
| 7,416,071 B2 * | 8/2008 | Popp et al. | 192/220 |
| 2004/0025941 A1 * | 2/2004 | Wuerth et al. | 137/487.5 |
| 2005/0273218 A1 * | 12/2005 | Breed | B60C 11/24 701/2 |

FOREIGN PATENT DOCUMENTS

| | | |
|---|---|---|
| DE | 100 06 682 | 10/2001 |
| DE | 10/2005/046017 | 4/2006 |
| EP | 1 391 362 | 2/2004 |
| JP | 8-268104 | 10/1996 |
| JP | 2004-50925 | 2/2004 |
| JP | 2005-343248 | 12/2005 |
| JP | 2006-35967 | 2/2006 |
| WO | WO 99/38738 | 8/1999 |
| WO | WO 2004/110804 | 12/2004 |

\* cited by examiner

FAILSAFE PARKING ASSISTANCE SYSTEM

FIELD OF THE INVENTION

The present invention relates to a method for protecting a parking assistance system from errors of the service brake system and a parking assistance system.

BACKGROUND INFORMATION

Parking assistance systems support the driver in maneuvering, in particular during a parking operation. In doing so, the surroundings of the vehicle are scanned using sensors and the vehicle is automatically braked if it approaches another object too closely, e.g., a parked vehicle. This can prevent a collision with the other object and damage to the host vehicle.

Known parking assistance systems normally include a control unit having an algorithm, ultrasonic sensors for scanning the vehicle's surroundings, and an actuator of the brake system such as a hydraulic power unit. As soon as the vehicle comes within a minimum distance, the control unit automatically activates the actuator and the vehicle is automatically braked.

If the brake system fails during a parking operation—for example due to an error in the brake actuator or brake control unit—the vehicle is no longer automatically braked, making it possible for a collision with another object to occur.

SUMMARY OF THE INVENTION

An object of the exemplary embodiments and/or exemplary methods of the present invention is therefore to protect a brake assistance system from a failure of the service brake system.

This object is achieved according to the exemplary embodiments and/or exemplary methods of the present invention by the features described herein. Additional embodiments of the present invention are the object of the further described features.

An aspect of the exemplary embodiments and/or exemplary methods of the present invention is to monitor the function of the service brake system and if an error is detected, to brake the vehicle using another brake system and/or to interrupt the transmission of the engine's drive torque to the wheels. This may effectively prevent a collision with surrounding objects.

According to a first specific embodiment of the present invention, an automatic parking brake is used instead of the service brake system to brake the vehicle. To this end, the actuator of the automatic parking brake, such as a so-called "cable puller" or an electric motor situated on the brake caliper, is activated to brake the vehicle. The automatic braking intervention may be performed either by the control unit of the service brake system—if it is functional—or by any other control unit. The function of the brake system control unit may be monitored by another control unit which intervenes in the driving operation if the former has an error.

According to a second specific embodiment of the present invention, an automatic transmission having an automatic gear position selector is used to brake the vehicle. In this case, gear position "P" of the automatic transmission is set to stop the vehicle. As long as the control unit of the service brake system is functional, it sends the activating request to the transmission control unit. If the brake system control unit fails, another control unit, in this case, e.g. the transmission control unit, may generate the activating request for the gear position selector. The switch into park position "P" may only be made at speeds lower than a specified maximum speed.

According to a third specific embodiment of the present invention, the automatic transmission is used to interrupt the transmission of force from the vehicle engine to the wheels. If an error occurs in the service brake system, the gear position selector is activated and the idling or neutral gear position "N" is selected. If the brake system control unit is functional, it transfers, e.g., a control signal to the transmission control unit, which in turn activates the gear position selector. If the brake system control unit fails, another control unit, in particular the transmission control unit, may be automatically activated.

The function of the brake system control unit may be continuously monitored by at least one other control unit. If the first brake control unit fails, the other control unit may be automatically activated and intervenes in the driving operation. The control units are connected to one another via a bus (e.g., CAN).

The three possibilities for protecting a parking assistance system referred to above may also be implemented in combination. For example, it is possible to interrupt both the transmission of drive torque to the wheels as well as to activate a brake device to intervene in the driving operation.

With regard to the brake system, the function of the hydraulic power unit, in particular the function of the delivery pump(s), the valves and, if necessary, other components as well as the function of the brake control unit is monitored.

The exemplary embodiments and/or exemplary methods of the present invention will be explained in greater detail below with reference to the appended drawings.

DETAILED DESCRIPTION

Figure 1:
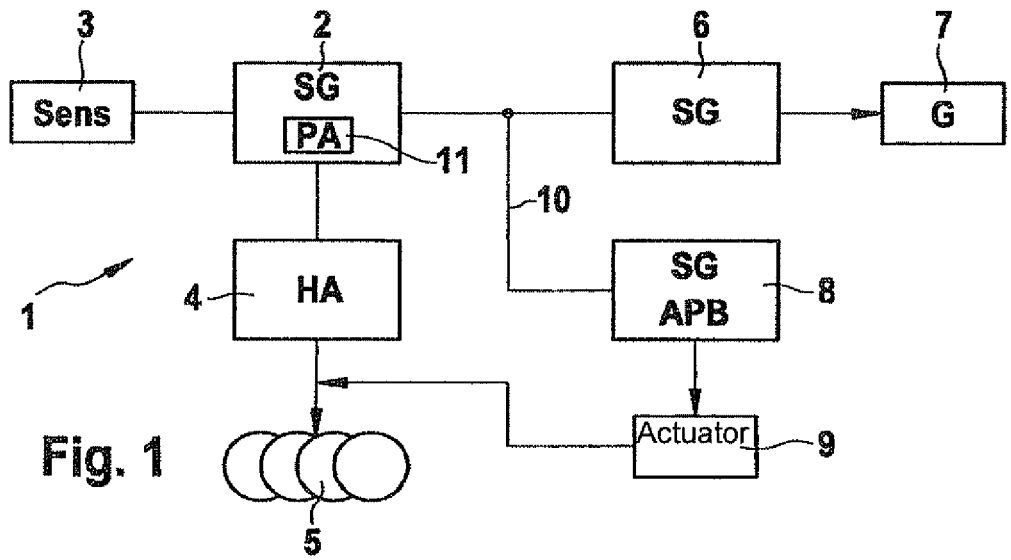
FIG. 1 shows a schematic block diagram of a parking assistance system that is protected from failure of the brake system.

FIG. 1 shows a schematic block diagram of a parking assistance system which is denoted in its entirety by reference symbol 1. The parking assistance system essentially includes a brake control unit 2 having a parking assistance algorithm 11, a hydraulic power unit 4 for modulating the braking forces acting on wheel brakes 5, as well as actual wheel brakes 5. Ultrasound-based surroundings sensors 3 are used to scan the surroundings.

In a parking operation in which the parking assistance system is active, parking assistance algorithm 11 monitors the surroundings of the vehicle with regard to surrounding objects and automatically intervenes in the driving operation using brake system 4, 5 if the vehicle approaches another object too closely. In this case, parking assistance algorithm 11 is provided in a brake control unit 2; however, it may in principle also be integrated into any other control unit.

In order to prevent a collision in the event of a defective service brake system, the parking assistance system is coupled to at least one other vehicle system, via which the vehicle may either be braked or the transmission of the drive torque to the wheels may be interrupted. In the present exemplary embodiment, parking brake system 1 is connected to an automatic transmission 6, 7 and an automatic parking brake 8, 9 (APB). The mode of operation of this total system is described in greater detail below with reference to FIG. 2.

Figure 2:
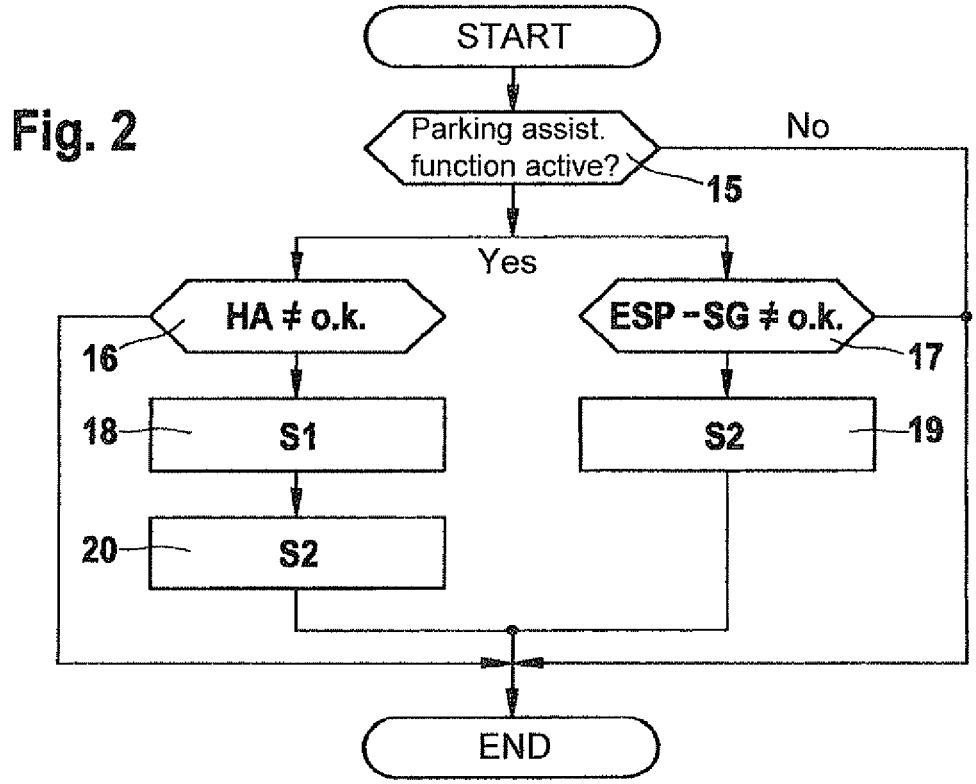
FIG. 2 shows a flow chart representing the essential process steps of the method for protecting an automated parking operation in the case of an error in the brake system.

FIG. 2 shows a flow chart of a method for protecting a parking assistance system 1 from a failure of brake system 2, 4, 5. In a first step 15, it is initially determined whether the parking assistance function is active. If the answer is yes (Y), brake control unit 2 monitors hydraulic power unit 4 with regard to errors (step 16). At the same time, brake control unit 2 is monitored by transmission control unit 6 or control unit 8 of the automatic parking brake (step 17). If an error is present in the hydraulic power unit (case Y in step 16), brake control unit 2 sends an activating request to transmission control unit 6 and/or APB control unit 8 in step 18. If transmission control unit 6 is addressed, it generates in step 20 a request to a gear selector 7 to set park position "P" or neutral position (idling) "N". If APB control unit 8 is addressed, it generates an activating signal for gear selector 7 to set park position "P" and/or an activating signal for actuator 9 of the parking brake in order to apply the parking brake and brake the vehicle.

If an error is detected in control unit 2 of the brake system (case Y) in step 17, transmission control unit 6 or control unit 8 of the automatic parking brake itself intervenes in the driving operation. The particular control unit 6 or 8 in this case generates an activating command to gear selector 7 and/or actuator 9 of the automatic parking brake in step 19 in order to brake the vehicle or interrupt the drive train. In this manner, it is possible to prevent a possible collision.

In addition, the driver may for example be informed of the fault condition optically or acoustically. This ends the procedure.

What is claimed is:

1. A method for protecting a parking assistance system in a vehicle, which also includes a service brake system, from an error of the service brake system, the method comprising:
   monitoring, via a control unit of the service brake system, a functioning of a hydraulic power unit of the service brake system for an error while performing a parking assistance using the service brake system; and
   issuing, via the control unit of the service brake system, a request in immediate response to detecting the error, which request causes one of a control unit of an automatic transmission system and a control unit of an automatic parking brake to issue a first command that activates the automatic transmission system to interrupt a transmission of drive torque to wheels of the vehicle by controlling a gear position selector to select a different gear position; and
   monitoring, via at least one of the control unit of the automatic transmission system and the control unit of the automatic parking brake, a functioning of the control unit of the service brake system to determine whether the control unit of the service brake system is functional, wherein the monitoring of the functioning of the control unit of the service brake system is performed together with the monitoring of the functioning of a hydraulic power unit of the service brake system; and
   issuing, via at least one of the control unit of the automatic transmission system and the control unit of the automatic parking brake, the first command in response to detecting that the control unit of the service brake system is no longer functional.

2. The method of claim 1, wherein the gear position selector is controlled to set idling position "N" and thus interrupt the drive train.

3. The method of claim 1, wherein the gear position selector is controlled to select park position "P", wherein park position "P" is selected only if the driving speed is lower than a specified maximum speed, and wherein the gear position selector is controlled to set idling position "N" and thus interrupt the drive train.

4. The method of claim 1, wherein the first command is issued by the control unit of an automatic parking brake, the method further comprising:
   at the control unit of an automatic parking brake, issuing a second command together with the first command, the second command causing the automatic parking brake to be applied, thereby braking the vehicle.

5. The method of claim 1, wherein the gear position selector is controlled to select park position "P".

6. The method of claim 5, wherein park position "P" is selected only if the driving speed is lower than a specified maximum speed.

7. A parking assistance system in a vehicle, comprising:
   a control unit having a parking assistance algorithm;
   a sensor system for scanning surroundings of the vehicle; and
   an actuator of a service brake system;
   wherein the parking assistance algorithm is configured to monitor a functioning of a hydraulic power unit of the service brake system for an error while performing the parking assistance using the service brake system, and to issue a request in immediate response to detecting the error, which request causes one a control unit of an automatic transmission system and a control unit of an automatic parking brake to issue a first command that activates the automatic transmission system to interrupt a transmission of drive torque to wheels of the vehicle by controlling a gear position selector to select a different gear position,
   wherein at least one of the control unit of the transmission system and the control unit of the automatic parking brake is configured to monitor a functioning of the control unit having a parking assistance algorithm to determine whether the control unit having a parking assistance algorithm is functional, and to issue the first command in response to detecting that the control unit having a parking assistance system is no longer functional, and
   wherein the monitoring of the functioning of the control unit of the service brake system is performed together with the monitoring of the functioning of a hydraulic power unit of the service brake system.

8. The parking assistance system of claim 7, wherein the gear position selector is controlled to set idling position "N" and thus interrupt the drive train.

9. The parking assistance system of claim 1, wherein the gear position selector is controlled to select park position "P", wherein park position "P" is selected only if the driving speed is lower than a specified maximum speed, and wherein the gear position selector is controlled to set idling position "N" and thus interrupt the drive train.

10. The parking assistance system of claim 7, wherein the first command is issued by the control unit of an automatic parking brake, and wherein the control unit of an automatic parking brake issues a second command together with the first command, the second command causing the automatic parking brake to be applied, thereby braking the vehicle.

11. The parking assistance system of claim 7, wherein the gear position selector is controlled to select park position "P".

12. The parking assistance system of claim 11, wherein park position "P" is selected only if the driving speed is lower than a specified maximum speed.

13. A parking assistance system in a vehicle, comprising:
a brake control unit having a parking assistance algorithm configured to monitor a hydraulic power unit of a service brake system for an error in the hydraulic power unit, and to issue a request in immediate response to detecting the error, which request causes one a control unit of an automatic transmission system and a control unit of an automatic parking brake to issue a first command that activates the automatic transmission system to interrupt a transmission of drive torque to wheels of the vehicle by controlling a gear position selector to select a different gear position;
a second control unit configured to simultaneously with the monitoring of the hydraulic power unit by the brake control unit, monitor the brake control unit for an error in the brake control unit, and to issue the first command in response to detecting that the control unit having a parking assistance system is no longer functional, wherein the monitoring of the functioning of the control unit of the service brake system is performed together with the monitoring of the functioning of a hydraulic power unit of the service brake system.

14. The parking assistance system of claim 13, wherein the first command is issued by the control unit of an automatic parking brake, and wherein the control unit of an automatic parking brake issues a second command together with the first command, the second command causing the automatic parking brake to be applied, thereby braking the vehicle.

* * * * *